(12) United States Patent
Watanabe et al.

(10) Patent No.: US 9,739,487 B2
(45) Date of Patent: Aug. 22, 2017

(54) GLOW PLUG

(71) Applicant: NGK SPARK PLUG CO., LTD., Nagoya-shi, Aichi (JP)

(72) Inventors: Tadashi Watanabe, Komaki (JP); Yoshihiro Yamamoto, Kitanagoya (JP); Toshiki Hirokawa, Nagoya (JP); Akimitsu Sassa, Toukai (JP)

(73) Assignee: NGK SPARK PLUG CO. LTD., Nagoya (JP)

( * ) Notice: Subject to any disclaimer, the term of this patent is extended or adjusted under 35 U.S.C. 154(b) by 426 days.

(21) Appl. No.: 14/457,618

(22) Filed: Aug. 12, 2014

(65) Prior Publication Data
US 2015/0047592 A1 Feb. 19, 2015

(30) Foreign Application Priority Data

Aug. 13, 2013 (JP) .................................. 2013-168199
Jun. 6, 2014 (JP) .................................. 2014-117569

(51) Int. Cl.
*F23Q 7/22* (2006.01)
*F23Q 7/00* (2006.01)
(Continued)

(52) U.S. Cl.
CPC .............. *F23Q 7/001* (2013.01); *F02P 19/02* (2013.01); *G01L 23/221* (2013.01); *F23Q 2007/002* (2013.01)

(58) Field of Classification Search
CPC .. G01M 15/08; F23Q 7/001; F23Q 2007/005; F23Q 2007/002; F02P 19/028; F02P 19/02; G01L 23/10
See application file for complete search history.

(56) References Cited

U.S. PATENT DOCUMENTS 8,893,545 B2 * 11/2014 Nakamura ............ G01M 15/08
                                                        73/114.18
2013/0042831 A1 * 2/2013 Nishiyuki ............... G01L 23/10
                                                        123/145 A
2013/0319094 A1 12/2013 Nakamura et al.

FOREIGN PATENT DOCUMENTS

DE   10 2010 037 476 A1   3/2012
JP   2009-520941 A        5/2009
(Continued)

OTHER PUBLICATIONS

EPO, Extended European Search Report issued in corresponding EP application No. 14180805.5, dated Dec. 11, 2014.
(Continued)

*Primary Examiner* — Shawntina Fuqua
(74) *Attorney, Agent, or Firm* — Stites & Harbison, PLLC; Jeffrey A. Haeberlin; Joseph P. Morris (57) ABSTRACT

A glow plug includes a cylindrical housing, a rod-shaped heater, a membrane portion, and a pressure sensor. The cylindrical housing extends along an axial direction. The rod-shaped heater extending along the axial direction is displaced along the axial direction and has one end portion disposed within the housing, and an other end portion which is exposed from the housing. The membrane portion connects together the heater and the housing and has a multilayer construction which has a first layer and a second layer of which at least part is positioned nearer to the other end portion in the axial direction of the heater than the first layer. The pressure sensor measures a pressure within a combustion chamber in which the other end portion is disposed by making use of a displacement of the heater. A thickness of the second layer is larger than a thickness of the first layer.

9 Claims, 8 Drawing Sheets (51) Int. Cl.
*F02P 19/02* (2006.01)
*G01L 23/22* (2006.01)

(56) References Cited

FOREIGN PATENT DOCUMENTS

| KR | 2013-0020878 A | 3/2013 |
|----|----------------|--------|
| WO | 2007/073959 A1 | 7/2007 |
| WO | 2012/115080 A1 | 8/2012 |

OTHER PUBLICATIONS

Korean Intellectual Property Office, Notice of Grounds for Rejection issued in corresponding Korean Patent Application No. 2014-0105238, dated Mar. 2, 2016.

* cited by examiner

THIRD EMBODIMENT

*FIG. 6*

| SECOND LAYER THICKNESS (mm) | DURABILITY |
|---|---|
| 0.25 | △ |
| 0.24 | △ |
| 0.23 | ○ |
| 0.20 | ◉ |
| 0.17 | ◉ |
| 0.15 | ○ |
| 0.14 | △ |
| 0.13 | × |
| 0.10 | × |
| 0.05 | × |

FIG. 7

MODIFIED EXAMPLE

GLOW PLUG

CROSS REFERENCE TO RELATED APPLICATIONS

The present invention claims priority from Japanese Patent Application No. 2013-168199, which was filed on Aug. 13, 2013, and Japanese Patent Application No. 2014-117569, which was filed on Jun. 6, 2014, the disclosure of which is herein incorporated by reference in its entirety.

BACKGROUND OF THE INVENTION

Field of the Invention

The present invention relates to a glow plug.

Description of Related Art

A glow plug is used as an auxiliary heat source of a compression ignition internal combustion engine (for example, a diesel engine or the like). As a glow plug, a glow plug is known which is provided with an additional function to measure a pressure within a combustion chamber by a pressure sensor provided (for example, Patent Document 1). The pressure sensor measures a change in pressure within the combustion chamber by making use of the movement of a heater portion which projects into the combustion chamber. The movement is generated in association with a change in pressure and occurs along the direction of an axis of the heater portion. When the heater portion moves in this way, it is preferable that gas-tightness is ensured between the glow plug and the combustion chamber while holding the heater portion movable. To make this happen, the glow plug includes a thin sheet-like membrane portion (in general, also, referred to as a "membrane"). The membrane portion connects the heater portion and a housing together.

RELATED ART DOCUMENTS

Patent Document 1: JP-A-2009-520941

BRIEF SUMMARY OF THE INVENTION

According to the technique in which the heater portion and the housing are connected together by the membrane portion, there is a problem that an error is produced in the measured pressure value due to the extension or contraction of the membrane portion triggered in association with a change in temperature inside the combustion chamber. In addition, the membrane portion is exposed to environments of high temperature, high humidity and high pressure, resulting in a problem that the membrane portion is easy to be deteriorated.

The invention has been made with a view to solving the problems, and the invention can be realized as the following form or application example.

(1) According to an aspect of the present invention, there is provided glow plug, comprising:

a cylindrical housing which extends along an axial direction;

a rod-shaped heater configured to be displaced along the axial direction and having one end portion (i.e., a proximal end portion or a rear end portion) which extends along the axial direction and which is disposed within the housing, and an other end portion (i.e., a distal end portion or a front end portion) which is disposed so as to be exposed from the housing;

a membrane portion configured to connect together the heater and the housing and having a multi-layer construction which has a first layer, and a second layer of which at least part is positioned nearer to the other end portion in the axial direction of the heater than the first layer; and a pressure sensor which measures a pressure within a combustion chamber in which the other end portion is disposed by making use of a displacement of the heater, wherein a thickness of the second layer is larger than a thickness of the first layer.

In this glow plug, since the other end portion side is used while being positioned nearer to the combustion chamber, the temperature tends to change more frequently than at the one end portion side. However, since the thickness of the second layer which is positioned nearer to the other end portion side is made larger, the rigidity of the second layer is enhanced so that the second layer can withstand sufficiently the pressure in the combustion chamber over many hours. Because of this, the durability of the membrane portion can be improved while suppressing the generation of an error in measuring a pressure of the glow plug. In addition, the second layer can be made to function as a heat insulating layer so as to suppress the transfer of heat to the first layer. In addition, since at least part of the first layer is positioned further away from the other end portion side than the second layer (in other words, since at least part of the first layer is positioned nearer to the one end portion side than the second layer), the first layer is made more difficult to be deformed (expanded) in association with a change in temperature than the second layer. Because of this, in the configuration in which the first layer and the second layer are connected directly to each other or connected indirectly to each other with another element interposed therebetween, when the second layer is deformed (expanded) in association with a change in temperature, the deformation (expansion) of the second layer can be suppressed by the first layer.

(2) In the glow plug of the above-described aspect, the first layer and the second layer may each have a standing portion which extends along a direction which includes a radial component which is at right angles (i.e., perpendicular or normal) to the axial direction of the heater, and the standing portion of the second layer may be positioned nearer to the other end portion in the axial direction of the heater than the standing portion of the first layer.

According to the glow plug of this aspect of the invention, since the standing portion extends along the direction which includes the component in the radial direction, the standing portion tends to easily be exposed to the combustion gas when the combustion gas in the combustion chamber flows into the glow plug. However, since the thickness of the standing portion of the second layer which is positioned nearer to the other end portion side is larger than the thickness of the standing portion of the first layer which is positioned nearer to the one end portion side, the durability of the membrane portion can be improved.

(3) In the glow plug of the above-described aspect, a thermal expansion coefficient of the second layer may be smaller than a thermal expansion coefficient of the first layer.

According to the glow plug of this aspect of the invention, the deformation of the second layer can be suppressed more which would be caused by a change in temperature therein.

(4) In the glow plug of the above-described aspect,
a resistance to high temperature of the second layer may be larger than a resistance to high temperature of the first layer.

According to the glow plug of this aspect of the invention, the material of the first layer can be selected from a wide variety of materials. Since the first layer is made more difficult to be heated to a higher temperature than the second layer, as the material of the first layer, an arbitrary material can be selected which has a smaller high-temperature bearing load than that of the second layer.

(5) In the glow plug of the above-described aspect,
the first layer and the second layer may be layers which lie adjacent to each other in the multi-layer construction, and
the first layer and the second layer may be at least partially in contact with each other According to the glow plug of this aspect of the invention, since the first layer and the second layer are at least partially in contact with each other in the laminating direction, the rigidity of the whole of the membrane portion can be enhanced.

(6) In the glow plug of the above-described aspect,
a gap may be provided between the first layer and the second layer.

According to the glow plug of this aspect of the invention, the gap between the first layer and the second layer is allowed to function as the heat insulating layer, thereby making it possible to suppress more (i.e., to further reduce) the transfer of heat to the first layer.

(7) In the glow plug of the above-described aspect,
the membrane portion may have a cylindrical portion which extends along a direction which includes the axial direction of the heater, and
among the layers which make up the membrane portion (i.e., the first layer and the second layer of the membrane portion), the second layer may be positioned outermost in a radial direction which is at right angles (i.e., perpendicular or normal) to the axial direction of the heater.

According to the glow plug of this aspect of the invention, in the layers which make up the membrane portion, since the thickness of the second layer which is positioned outermost in the radial direction can be made larger than that of the first layer, the rigidity of the second layer which is exposed directly to the combustion gas which flows in from the combustion chamber can be enhanced, thereby making it possible to improve the durability of the second layer.

(8) In the glow plug of the above-described aspect,
the membrane portion may have a cylindrical portion which extends along a direction which includes the axial direction of the heater, and
among the layers which make up the membrane portion (i.e., the first layer and the second layer of the membrane portion), the first layer may be positioned innermost in a radial direction which is at right angles (i.e., perpendicular or normal) to the axial direction of the heater.

According to the glow plug of this aspect of the invention, since the second layer that is thicker exists outwards of the first layer, the transfer of heat to the first layer can be suppressed by the heat insulating effect of the second layer. Because of this, the extension or contraction of the first layer due to a change in temperature therein can be suppressed. In general, a layer that is positioned innermost is joined to a member that is in direct contact with a heater or a pressure sensor. Consequently, by suppressing the extension or contraction of the first layer associated with a change in temperature therein, the generation of an error in measuring a pressure in the combustion chamber can be suppressed further.

(9) In the glow plug of the above-described aspect,
the membrane portion may have
a first cylindrical portion which extends in a direction which includes the axial direction of the heater and which is connected to the housing,
a second cylindrical portion which extends in a direction which includes the axial direction of the heater and which is connected to the heater, and
a standing portion which is disposed between the first cylindrical portion and the second cylindrical portion and which is connected individually to the first cylindrical portion and the second cylindrical portion,
the second layer may be positioned nearest to the other end portion in the standing portion, and
an average thickness of the second layer in the membrane portion may be 0.15 mm or larger and 0.23 mm or smaller.

According to the glow plug of this aspect of the invention, since the average thickness of the second layer which is disposed nearest to the other end portion side in the standing portion is set appropriately, it is possible to restrain the second layer from being damaged as a result of the second layer becoming brittle due to the average thickness being set too small or to restrain the second layer from being damaged as a result of a large residual stress being generated when the standing portion is formed due to the average thickness being set too large.

The invention can be realized in various forms other than the glow plug. For example, the invention can be realized in forms such as a glow plug fabrication method, an energizing control system, a pressure measuring system, and the like.

BRIEF DESCRIPTION OF THE DRAWINGS

Illustrative aspects of the invention will be described in detail with reference to the following figures wherein:

FIGS. 1 (1A and 1B) is an explanatory diagram showing a schematic configuration of a glow plug 100 as a first embodiment of the invention.

FIGS. 8 (8A, 8B and 8C) is an explanatory diagram showing welded joints in a glow plug of a modified example 4.

DETAILED DESCRIPTION OF EXEMPLARY EMBODIMENTS OF THE INVENTION

A. First Embodiment

Figure 1A:
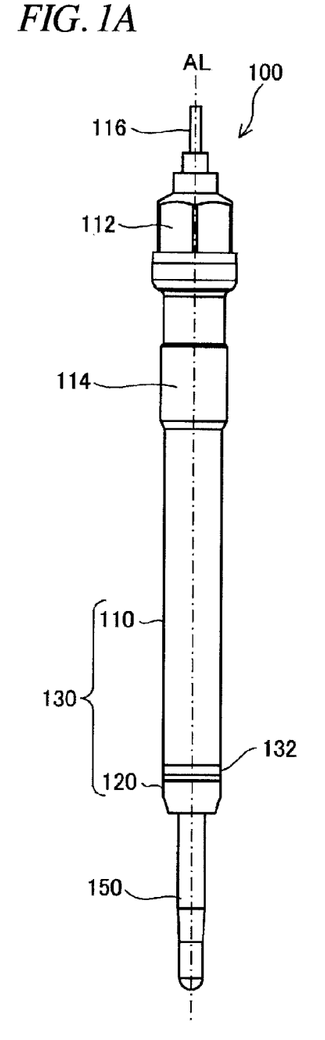
Figure 1B:
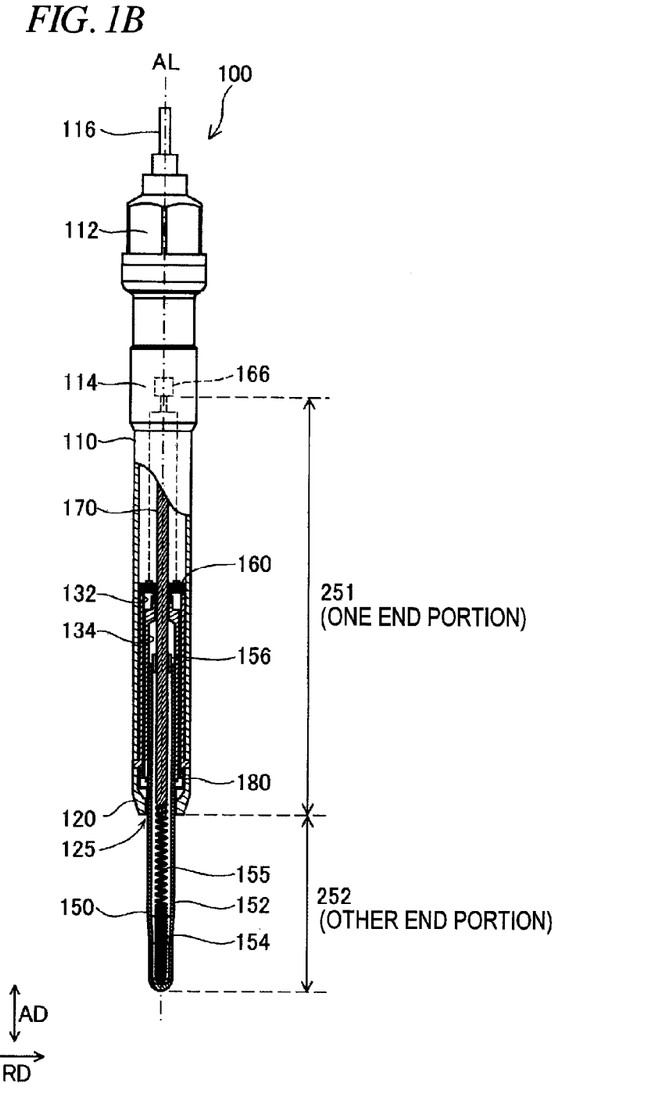

FIGS. 1 (1A and 1B) is an explanatory diagram showing a schematic configuration of a glow plug 100 as a first embodiment of the invention. FIG. 1A shows an external appearance of the glow plug 100, and FIG. 1B is a partially sectional view of the glow plug 100 shown in FIG. 1A. In the following description, a lower side of FIG. 1 is defined as a front end side, and an upper side of FIG. 1 is defined as a rear end side.

The glow plug 100 is installed, for example, in a combustion chamber of an internal combustion engine for use as an auxiliary heat source. Additionally, the glow plug 100 detects a pressure in the combustion chamber. The glow plug 100 includes a housing 130, a heater portion 150, a pressure sensor 160, and a membrane portion 180.

The housing 130 includes a metal shell 110 and a cap portion 120. An axis AL of the glow plug 100 coincides with an axis of the housing 130 and also coincides with axes of the heater portion 150 and the membrane portion 180. In the following description, a direction along the axis AL (that is, a direction directed from the front end side towards the rear end side, and a direction directed from the rear end side towards the front end side) is referred to as an axial direction AD, and a direction which is normal to the axial direction AD is referred to as a radial direction RD.

In the first embodiment, the metal shell 110 uses carbon steel as a material thereof, however, the material of the metal shell 110 is not limited to carbon steel, and hence, steel of an arbitrary type such as stainless steel may be used. The metal shell 110 has a substantially cylindrical shape. The pressure sensor 160 is disposed in an interior of the metal shell 110. The pressure sensor 160 outputs an electric signal which corresponds to a force received by the heater portion 150. A thread portion 114 is provided at a rear end side of the metal shell 110. The thread portion 114 includes screw threads (not shown) with which the glow plug 100 is fixed within a cylinder head. A tool mounting portion 112 is formed at a rear end side of the thread portion 114. A tool for mounting the glow plug 100 in the internal combustion engine is mounted on the tool mounting portion 112.

A plurality of wirings 116 are inserted into a rear end portion of the tool mounting portion 112. The plurality of wirings 116 are electrically connected to an integrated circuit 166 and a center shaft 170 (which will be described later by reference to FIG. 2) in the housing 130. The integrated circuit 166 outputs the electric signal from the pressure sensor 160 to an exterior portion by way of the wirings 116. The cap portion 120 is formed at a front end of the metal shell 110. In the first embodiment, the cap portion 120 uses carbon steel as a material thereof, however, the material is not limited to carbon steel, and hence, steel of an arbitrary type such as stainless steel may be used.

Figure 2:
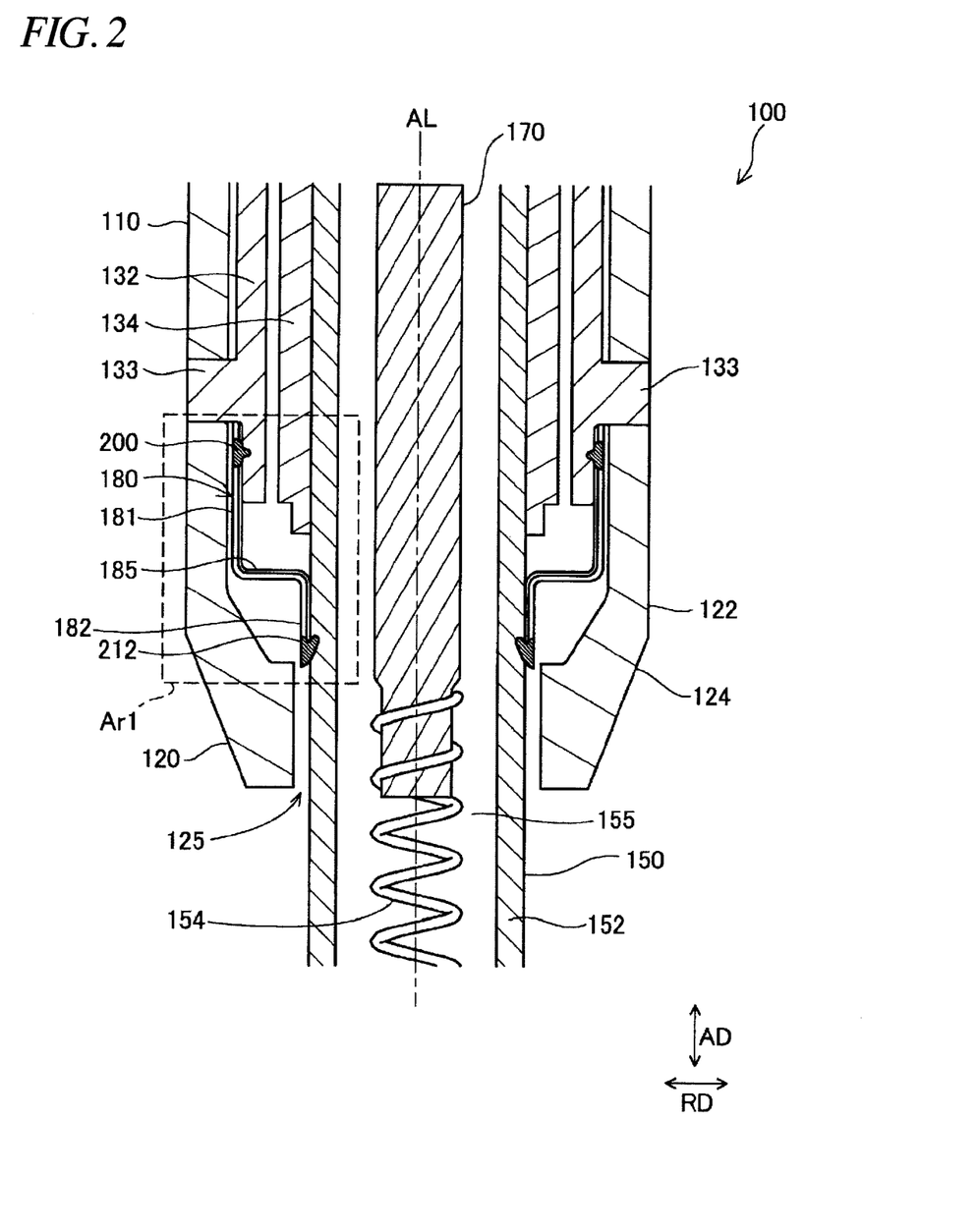
FIG. 2 is an enlarged sectional view of an area near a cap portion 120 shown in FIG. 1.

FIG. 2 is an enlarged sectional view of an area near the cap portion 120 shown in FIG. 1. A cylindrical portion 122 is formed at a rear end side of the cap portion 120. A tapered portion 124 is formed at a front end side of the cap portion 120. A diameter of the tapered portion 124 decreases as it extends towards the front end side.

A sensor fixing member 132, a transfer sleeve 134 and the membrane portion 180 are provided near the cap portion 120. The sensor fixing member 132 fixes the pressure sensor 160 in the interior of the housing 130. In the first embodiment, the sensor fixing member 132 uses stainless steel as a material thereof. The sensor fixing member 132 has a substantially cylindrical shape. The sensor fixing member 132 is disposed along an inner circumference of the metal shell 110. A collar-shaped flange portion 133 is formed in the vicinity of a front end of the sensor fixing member 132. The flange portion 133 is welded to a front end face of the metal shell 110 and a rear end face of the cap portion 120.

The transfer sleeve 134 transfers a displacement of the heater portion 150 along the axis AL to the pressure sensor 160. In the first embodiment, the transfer sleeve 134 uses stainless steel as a material thereof. The transfer sleeve 134 has a substantially cylindrical shape. A front end of the transfer sleeve 134 is welded to an outer circumference of the heater portion 150 in the vicinity of the flange portion 133.

The heater portion 150 is a rod-shaped member which extends along the axis AL and includes one end portion 251 which is housed in the housing 130 and the other end portion 252 which is disposed so as to be exposed from the housing 130 (so as to project from an opening portion 125 in the cap portion 120 towards the front end side) as shown in FIG. 1B. As shown in FIG. 2, the heater portion 150 includes a sheathed tube 152, a heating coil 154, and an insulating powder 155. In the first embodiment, the sheathed tube 152 uses stainless steel as a material thereof. A front end portion of the sheathed tube 152 is closed in a semispherical fashion, while a rear end is opened within the metal shell 110. The heating coil 154 is a coil-shaped resistor. The heating coil 154 is disposed in an interior of the sheathed tube 152 at a front end side. A front end portion of the center shaft 170 is inserted into the heater portion 150. The center shaft 170 is a metallic rod-shaped member. A rear end of the heating coil 154 is fixed to a front end of the center shaft 170. Electric power is supplied to the heating coil 154 through the wirings 116 and the center shaft 170.

The insulating powder 155 is packed in a gap defined between the heating coil 154 and an inner wall of the sheathed tube 152. In the first embodiment, the insulating powder 155 is magnesium oxide. As shown in FIG. 1B, a seal member 156 (refer to FIG. 1) is inserted between the opened rear end of the sheathed tube 152 and the center shaft 170. The seal member 156 seals the insulating powder 155 in the sheathed tube 152. The sheathed tube 152 is swaged. This enhances the denseness of the insulating powder 155 which is paced in the interior of the sheathed tube 152, thereby improving the heat transfer efficiency.

Figure 3:
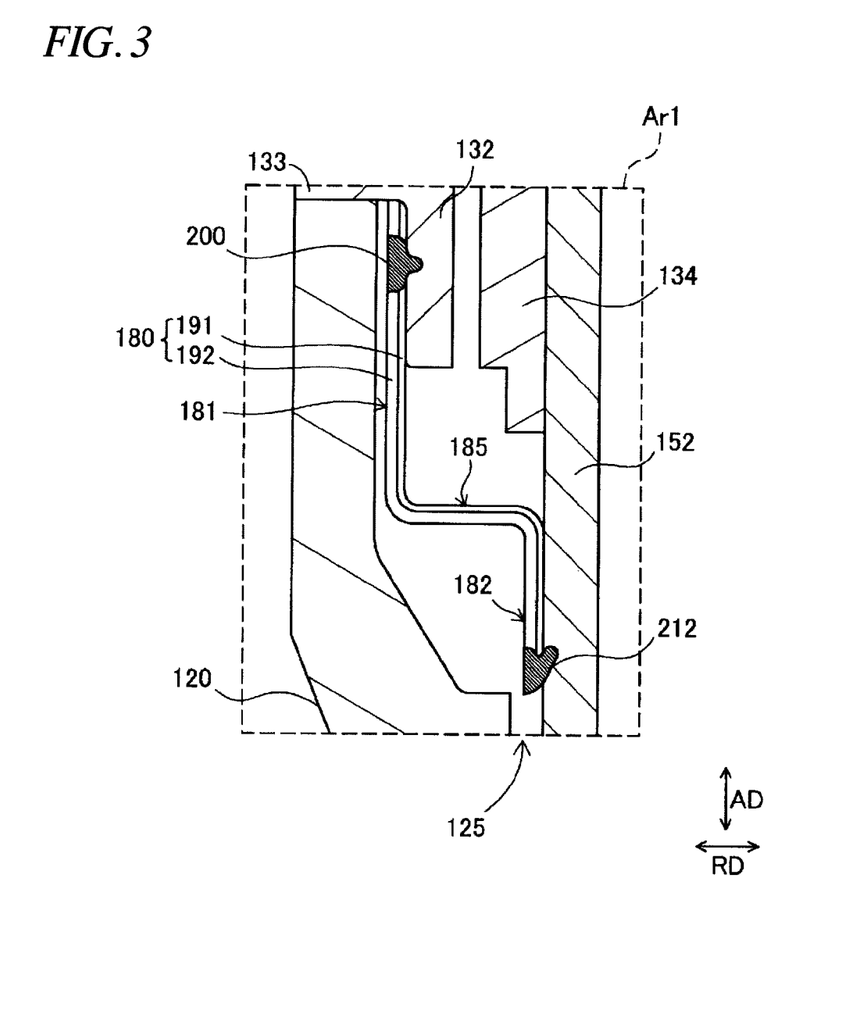
FIG. 3 is an enlarged sectional view of an area Ar1 near a membrane portion 180 shown in FIG. 2.

FIG. 3 is an enlarged sectional view of an area Ar1 lying near the membrane portion 180 shown in FIG. 2. The membrane portion 180 has a double-layer configuration in which a first layer 191 and a second layer 192 are laminated one on the other. These two layers 191, 192 each have a cylindrical external shape having an axis which coincides with the axis AL and contact each other in an arbitrary position along the axial direction AD. In this embodiment, the two layers 191, 192 are each formed of SUS (stainless steel).

Here, the second layer 192 has a thickness which is thicker than a thickness of the first layer 191. Consequently, the second layer 192 has a rigidity which is higher than a rigidity of the first layer 191. In the first embodiment, it is possible to improve the durability of the membrane portion 180 by making the thickness of the second layer 192 larger than the thickness of the first layer 191. The advantage of this configuration will be described in detail later.

When observing the construction of the membrane portion 180 from a different point of view from the double-layer construction, the membrane portion 180 is understood to include a first cylindrical portion 181, a second cylindrical portion 182, and a standing portion 185.

The first cylindrical portion 181 has an axis which coincides with the axis AL and has a cylindrical external appearance which extends in the axial direction AD. In other words, the first cylindrical portion 181 has a cylindrical external appearance in which a thickness direction coincides with the radial direction RD and a through hole extending along the axial direction AD is formed in the center. In the membrane portion 180, the first cylindrical portion 181 is positioned rearmost.

The second cylindrical portion 182 has an external shape which is similar to that of the first cylindrical portion 181. However, a central through hole formed in the second cylindrical portion 182 is smaller in size (diameter) than the through hole in the first cylindrical portion 181. Consequently, as shown in FIG. 2, a distance from the axis AL to the second cylindrical portion 182 along the radial direction RD is shorter than a distance from the axis AL to the first cylindrical portion 181 along the radial direction RD. The second cylindrical portion 182 is positioned frontmost in the membrane portion 180.

The standing portion 185 has a through hole in the center thereof and has a circular disc-like external shape which extends in the radial direction RD. In other words, the standing portion 185 has an external shape in which a thickness direction coincides with the axial direction AD and a through hole formed in a thickness direction is provided in the center. The size (diameter) of the through hole formed in the standing portion 185 substantially coincides with the size (diameter) of the through hole formed in the second cylindrical portion 182.

The first cylindrical portion 181 and the standing portion 185 are connected to each other, and the second cylindrical portion 182 and the standing portion 185 are connected to each other. As shown in FIGS. 2 and 3, connecting portions where the cylindrical portions and the standing portion are connected are radiused so that the individual portions 181, 185, 182 are connected to continue smoothly. A normal to surfaces (a front end side surface, a rear end side surface) of the standing portion 185 is parallel to the axis AL. Consequently, when the glow plug 100 is seen in a direction directed from the front end side to the rear end side, the front end side surface of the standing portion 185 is oriented to the front end side.

The construction described above is taken to understand that the first layer 191 and the second layer 192 each have a first cylindrical portion and that the first cylindrical portion 181 is formed by superposing the two first cylindrical portions one on the other. Similarly, it is understood that the first layer 191 and the second layer 192 each have a second cylindrical portion and that the second cylindrical portion 182 is formed by superposing the two second cylindrical portions one on the other. Additionally, it is understood that the first layer 191 and the second layer 192 each have a standing portion and that the standing portion 185 is formed by superposing the two standing portions one on the other.

As shown in FIG. 3, the membrane portion 180 is connected to the sheathed tube 152 at a front end side and is connected to the sensor fixing member 132 at a rear end side thereof. Specifically, the first cylindrical portion 181 is connected through welding to the sensor fixing member 132 via a weld joint 200. Since the sensor fixing member 132 is connected to the metal shell 110 via the flange portion 133, the membrane portion 180 is connected to the housing 130 by the weld joint 200. The second cylindrical portion 182 is connected to the sheathed tube 152 via a weld joint 212. Consequently, the membrane portion 180 is connected to the heater portion 150 by the weld joint 212. In the first embodiment, the two weld joints 200, 212 are formed through laser welding which pierces the first layer 191 and the second layer 192 altogether at one time. A gas-tightness can be ensured between the housing 130 and the heater portion 150 by performing the laser welding in that way.

The heater portion 150 is displaced along the axis AL when an external force (for example, a pressure within the combustion chamber) is exerted thereon along the axis AL. This displacement deforms the membrane portion 180. The membrane portion 180 is designed so that the deformation becomes an elastic deformation. The external force is generated by the pressure within the combustion chamber.

Here, combustion gas which is expanded as a result of combustion occurring in the combustion chamber flows into the glow plug 100 from a gap between the opening portion 125 and an outer circumferential surface of the heater portion 150. As this occurs, the combustion gas flows mainly along the axial direction AD from the front end side to the rear end side. Since the front end side surface of the standing portion 185 is oriented towards the front end side, it is highly possible that the standing portion 185 is subjected directly to the flow of combustion gas. However, the second layer 192 which is positioned further forwards (closer to the other end portion 252 along the axial direction AD) than the first layer 191 in the standing portion 185 is thicker and more rigid than the first layer 191. Because of this, even though the combustion gas, which is high in temperature, humidity and pressure, flows in from the opening portion 125 and the membrane portion 180 (the second layer 192) is exposed to the combustion gas, the durability of the membrane portion 180 can be improved. In addition, the second layer 192 provides the large thickness and high rigidity at any one of the first cylindrical portion 181, the second cylindrical portion 182 and the standing portion 185, and therefore, a heat insulating effect can be obtained thereat by the second layer 192. Because of this, since the extension or contraction of the first layer 191 can be suppressed which would be caused by a change in temperature, the displacement of the sheathed tube 152 and the transfer sleeve 134 which are in direct contact with the first layer 191 can be suppressed. Consequently, the generation of an error in measuring a combustion pressure can be suppressed.

In the glow plug 100 that has been described heretofore, the membrane portion 180 is given the double-layer construction of the first layer 191 and the second layer 192, and the thickness of the second layer 192 is made thicker than the thickness of the first layer 191. Therefore, the rigidity of the second layer 192 is enhanced and the durability of the second layer 192 is improved. Additionally, the second layer 192 is positioned at a front end side of the first layer 191 (at a side of the other end portion 252 along the axial direction AD), and therefore, the risk of the first layer 191 being exposed to the combustion gas is suppressed, thereby making it possible to suppress the extension or contraction of the first layer 191. Consequently, not only can the generation of an error in measuring a pressure in the combustion chamber be suppressed, but also the durability of the membrane portion 180 can be improved.

In addition, the second layer 192 is positioned further outwards along the radial direction RD than the first layer 191 at the first cylindrical portion 181 and the second cylindrical portion 182 and is positioned further forwards along the axial direction AD than the first layer 191 at the standing portion 185. Namely, since the second layer 192 covers the first layer 191, the second layer 192 can cut off heat that would otherwise be transferred to the first layer 191. Because of this, the extension or contraction of the first layer 191 can be suppressed which would be caused by a change in temperature therein. Here, since the first layer 191 is in direct contact with the sensor fixing member 132 and the sheathed tube 152, it is possible to suppress the generation of an error in measuring a pressure in the combustion chamber by suppressing the extension or contraction of the first layer 191.

Additionally, the second layer 192 is positioned further forwards to the front end side (the side where the other end portion 252 is provided) along the axial direction AD than the first layer 191 at the standing portion 185, and therefore, the second layer 192 is exposed directly to the combustion gas. However, the rigidity of the second layer 192 is enhanced by increasing the thickness of the second layer 192, and therefore, the durability of the standing portion 185 can be improved. This can improve the durability of the whole of the membrane portion 180.

Additionally, the first layer 191 and the second layer 192 are in contact with each other and are welded together through laser welding. Therefore, when the second layer 192 is deformed (expanded) so as to extend towards the other end portion 252 as a result of the temperature thereof being increased, the deformation (expansion) of the second layer 192 can be suppressed by the first layer 191 which is made difficult to be deformed (expanded) because the first layer 191 lies farther away from the other end portion 252 than the second layer 192 (in other words, because the first layer 191 lies nearer to the one end portion 251 than the second layer 192).

B. Second Embodiment

Figure 4:
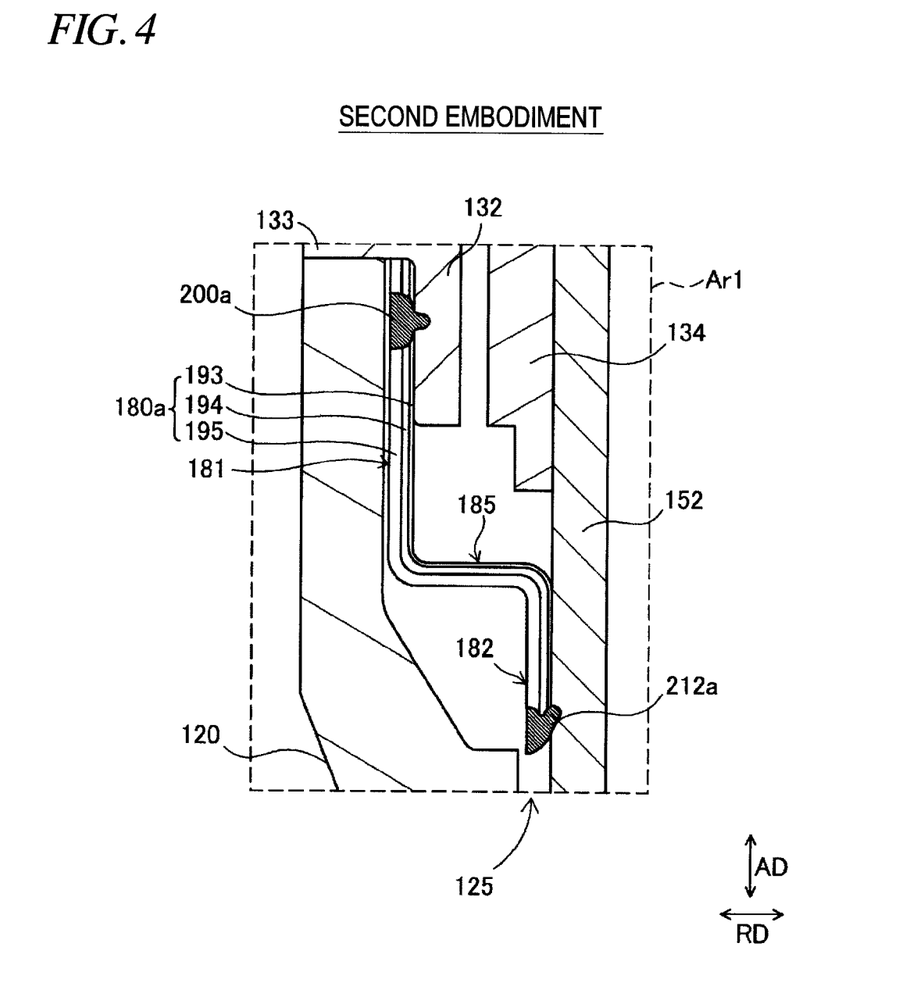
FIG. 4 is an enlarged sectional view of an area near a membrane portion of a glow plug of a second embodiment.

FIG. 4 is an enlarged sectional view of an area near a membrane portion of a glow plug of a second embodiment. In FIG. 4, an enlarged sectional view of an area Ar1 is shown which is identical to the area Ar1 of the first embodiment with respect to position and size.

The glow plug of the second embodiment is different from the glow plug 100 of the first embodiment in that the membrane portion has a three-layer construction and is the same as that of the first embodiment in the other configurations.

As shown in FIG. 4, a membrane portion 180*a* of the second embodiment has a configuration in which a first layer 193, a second layer 194 and a third layer 195 are laminated one on another. These three layers 193, 194, 195 all have cylindrical external shapes whose axes coincide with the axis AL.

When comparing the respective positions of the three layers 193, 194, 195 of a first cylindrical portion 181 and the respective positions of the three layers 193, 194, 195 of a second cylindrical portion 182, the first layer 193 is positioned innermost along a radial direction RD, the second layer 194 is position second innermost along the radial direction RD, and the third layer 195 is positioned outermost along the radial direction RD.

When comparing the respective positions of the three layers 193, 194, 195 of a standing portion 185, the third layer 195 is positioned frontmost (towards a side where the other end portion 252 is disposed) along an axial direction AD, the second layer 194 is positioned second frontmost, and the first layer 193 is positioned rearmost along the axial direction AD.

When comparing the respective thicknesses of the layers 193, 194, 195, the thickness of the first layer 193 is the smallest or thinnest, the thickness of the second layer 194 is the second thinnest, and the thickness of the third layer 195 is the most largest or thickest.

The first cylindrical portion 181 is connected to a sensor fixing member 132 by a weld joint 200*a*, and the second cylindrical portion 182 is connected to a sheathed tube 152 by a weld joint 212*a*. The two weld joints 200*a*, 212*a* may be formed, for example, through laser welding which pierces the three layers 193, 194, 195 altogether at one time.

The glow plug of the second embodiment which is configured in the way described above provides a similar advantage to that of the glow plug 100 of the first embodiment. Namely, in the three layers 193, 194, 195, the thickness of the layer which is positioned outermost along the radial direction RD is given a larger thickness at the first cylindrical portion 181 and the second cylindrical portion 182, and at the standing portion 185, the layer which is positioned further forwards along the axial direction AD is given a larger thickness, whereby the durability of the membrane portion 180*a* can be improved. In addition, as a result of the membrane portion 180*a* having the three-layer construction, heat can be restrained from being transferred to the first layer 193 by the heat insulating effect of the second layer 194 and the third layer 195. Consequently, since the extension or contraction of the first layer 193 which is in direct contact with the sensor fixing member 132 and the sheathed tube 152 can be suppressed, it is possible to suppress the generation of an error in measuring a pressure in the combustion chamber.

The first layer 193 and the second layer 194 in the second embodiment correspond to a first layer and a second layer in claims. Additionally, the second layer 194 and the third layer 195 in the second embodiment also correspond to the first layer and the second layer in the claims.

C. Third Embodiment

Figure 5:
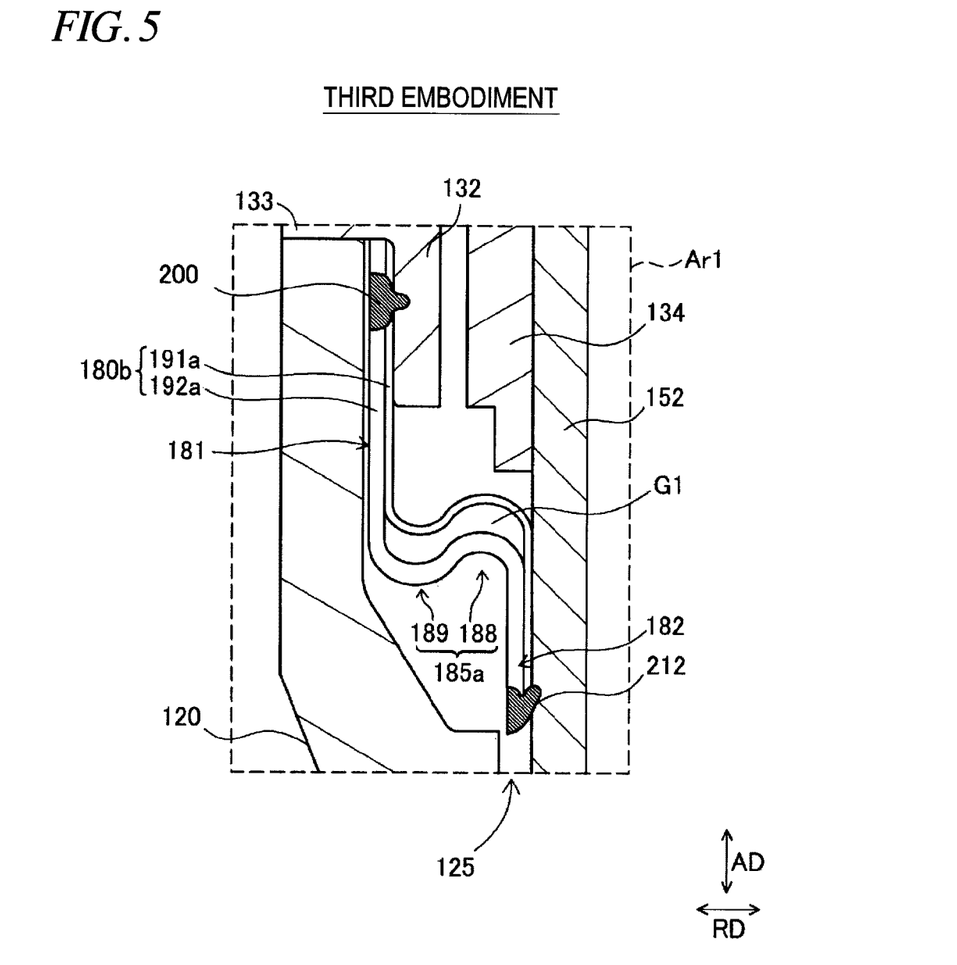
FIG. 5 is an enlarged sectional view of an area near a membrane portion of a glow plug of a third embodiment.

FIG. 5 is an enlarged sectional view of an area near a membrane portion of a glow plug of a third embodiment. In FIG. 5, an enlarged sectional view of an area Ar1 is shown which is identical to the area Ar1 of the first embodiment shown in FIG. 2 with respect to position and size.

The glow plug of the third embodiment is different from the glow plug 100 of the first embodiment in that a first layer and a second layer are not brought into contact with each other at a standing portion and is identical to the glow plug 100 of the first embodiment in the other configurations. Consequently, in the third embodiment, being similar to the first embodiment, the thickness of a second layer 192*a* is larger than the thickness of a first layer 191*a*.

As shown in FIG. 5, in the glow plug of the third embodiment, a membrane portion 180*b* includes a first layer 191*a*, a second layer 192*a*, and a gap G1. The configurations of a first cylindrical portion 181 and a second cylindrical portion 182 of the glow plug of the third embodiment are identical to the configurations of the first cylindrical portion 181 and the second cylindrical portion 182 of the glow plug 100 of the first embodiment.

In contrast to this, the configuration of a standing portion 185*a* of the glow plug of the third embodiment differs from the configuration of the standing portion 185 of the glow plug 100 of the first embodiment. Specifically, the standing portion 185*a* has a configuration in which the gap G1 is disposed between the first layer 191*a* and the second layer 192*a*, and the standing portion 185*a* has a substantially S-shaped cross-sectional shape. To describe the configuration of the standing portion 185*a* in a different way, the standing portion 185*a* has a first bent portion 188 and a second bent portion 189, and the first bent portion 188 and the second bent portion 189 are connected together. The first bent portion 188 is positioned more inwards (nearer to an axis AL) along a radial direction RD and is connected to the second cylindrical portion 182. The second bent portion 189 is positioned more outwards (farther away from the axis AL) along the radial direction RD and is connected to the first cylindrical portion 181.

The first bent portion 188 has an external shape in which the first bent portion 188 is convex at a rear end side along an axial direction AD and is concave at a front end side along the axial direction AD. In contrast to this, the second bent portion 189 has an external shape in which the second bent portion 189 is convex at a front end side along the axial direction AD and is concave at a rear end side along the axial direction AD. In other words, the first bent portion 188 and the second bent portion 189 have round shapes which are oriented in opposite directions. By the first bent portion 188 and the second bent portion 189 being connected to each other in an end-to-end fashion, the standing portion 185a has a substantially S-shaped sectional shape as a whole.

As shown in FIG. 5, at the first bent portion 188 and the second bent portion 189, the second layer 192a, the gap G1 and the first layer 191a are disposed sequentially in this order along the axial direction AD from the front end side to the rear end side.

The glow plug of the third embodiment which is configured in the way that has been described above provides the same advantage as that provided by the glow plug 100 of the first embodiment. In addition, since the gap G1 is provided between the first layer 191a and the second layer 192a at the standing portion 185a, the heat insulating effect can be improved by making use of the gap G1. Because of this, since the extension or contraction (thermal expansion) of the first layer 191a associated with a change in temperature therein can be suppressed by the heat insulating effect of the second layer 192a and the gap G1, the generation of an error in measuring a pressure in the combustion chamber can be suppressed.

D. Example

Figure 6:
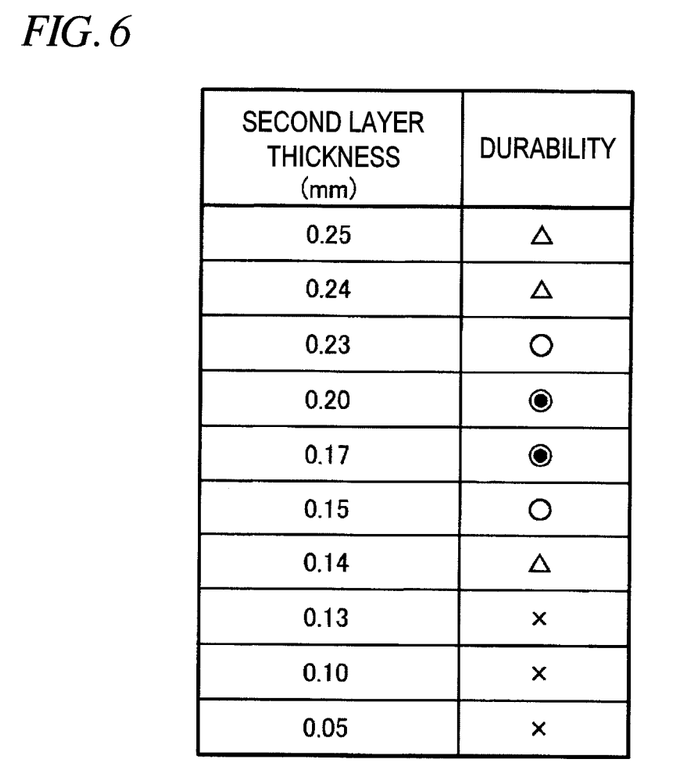
FIG. 6 is an explanatory table showing durability evaluation results of the glow plugs of the examples.

As an example, glow plugs were fabricated according to the third embodiment. Durability performance tests were carried out on the thus-fabricated glow plugs for evaluation. FIG. 6 is a table which shows the results of the durability evaluations made on the glow plugs of the example. In the durability tests, firstly, a plurality of glow plugs (samples) were fabricated. In these glow plugs, second layers like the second layer 192a shown in FIG. 5 were fabricated so as to have different thicknesses. Specifically, as shown in FIG. 6, ten samples having different second layers 192a of different thicknesses are prepared. A plurality of glow plugs were fabricated for each type. In the samples, first layers 191a each have a thickness of 0.1 mm.

Next, sensitivity tests were carried out on each sample. In the sensitivity tests, the sensitivities of the samples in their initial state were measured. Specifically, each sample was disposed within a chamber where the atmospheric pressure can be controlled, and an output (an output voltage) of a pressure sensor 160 was measured when the pressure within the chamber became a predetermined pressure. The predetermined pressure was 5 MPa. In the following description, the measurement of an output value of the pressure sensor 160 at this predetermined pressure is referred to as a "reference pressure sensitivity measurement." The results of the reference pressure sensitivity measurements carried out initially mean sensitivities of the samples in the initial states.

Following this, each sample was subjected to a test in which the pressure in the chamber was increased up to 15 MPa and thereafter decreased down to the atmospheric pressure. This test was conducted $10^8$ times. Then, the reference pressure sensitivity measurement was carried out on the sample. Then, the measured value (sensitivity) was compared with the sensitivity in the initial state, and when an error of 5% or more was found, the sample was evaluated as having a worst durability (which was indicated by a sign x).

When the second layer 192a is deteriorated as a result of the repetition of increasing and decreasing the pressure within the chamber a number of times, resulting in the generation of cracks in the second layer 192a or extension of the second layer 192a, the pressure sensor 160 outputs difference values even under the same pressure exerted. Then, when the error of the predetermined value (5% in this example) was found in one sample, the sample was evaluated as the second layer 192a being deteriorated.

Next, a sample of a different type from the sample evaluated as having the worst durability (x) was subjected to a test in which the pressure in the chamber was increased up to 20 MPa and thereafter decreased down to the atmospheric pressure. This test was conducted $10^8$ times. Then, the reference pressure sensitivity measurement was carried out on the sample. Then, the measured value (sensitivity) was compared with the sensitivity in the initial state, and when an error of 5% or more was found, the sample was evaluated as having a third highest durability (which was indicated by a sign Δ). The sample used in this test was different from the sample which had been subjected to the test in which the pressure in the chamber was increased and decreased repeatedly.

Next, a sample of a different type from the samples evaluated as having the worst durability (x) and as having the third highest durability (Δ) was subjected to a test in which the pressure in the chamber was increased up to 20 MPa and thereafter decreased down to the atmospheric pressure. This test was conducted $10^9$ times. Then, the reference pressure sensitivity measurement was carried out on the sample. Then, the measured value (sensitivity) was compared with the sensitivity in the initial state, and when an error of 5% or more was found, the sample was evaluated as having a second highest durability (which was indicated by a sign ◯). Additionally, when the error of 5% or more was not found, the sample was evaluated as having the highest durability (⊙). The sample used in this test was different from the sample which had been subjected to the test in which the pressure in the chamber was increased and decreased repeatedly.

As shown in FIG. 6, when the thickness of the second layer 192a was 0.05 mm, 0.10 mm, and 0.13 mm, the durability was the worst (x). It is assumed that since the thickness of the second layer 192a is relatively small, cracks or the like are easily generated due to the fluctuation in pressure.

When the thickness of the second layer 192a was 0.14 mm, 0.24 mm, and 0.25 mm, the durability was evaluated as being the third highest (Δ). With the thickness of 0.14 mm, similar to the thickness of 0.05 mm or the like described above, it is assumed that since the thickness of the second layer 192a is relatively small, cracks or the like are easily generated due to the fluctuation in pressure. On the other hand, even with the thicknesses of 0.24 mm and 0.25 mm, that is, even though the thickness of the second layer 192a is relatively large, the samples were evaluated as having a relatively low durability. It is assumed that the relatively low durability resulted from the following reason. Namely, it is assumed that since the thickness of the second layer 192a was relatively large, a large residual stress was generated when the base material was bent to form the standing portion 185a. And since this residual stress was generated, the second layer 192a was easily damaged due to the fluctuation in pressure.

The durability was evaluated as being the second highest (○) when the thickness of the second layer 192a was 0.15 mm and 0.23 mm. Additionally, when the thickness of the second layer 192a was 0.17 and 0.20 mm, the durability was evaluated as being the highest (⊙). It is assumed that these relatively high evaluations resulted from the pressure fluctuation attributed to the thickness which is too small or the pressure fluctuation attributed to the residual stress being suppressed.

According to the embodiments that have been described heretofore, in the glow plug of the third embodiment, the durability was able to be improved by setting the thickness of the second layer 192a to the range of 0.15 mm or larger to 0.23 mm or smaller. Additionally, it is assumed that also, in the glow plugs of the other embodiments, in addition to the glow plug of the third embodiment, the durability could be improved by setting the thickness of the outermost layer of the standing portion 185a (the layer closest to the other end portion 252 along the axial direction AD) to the range of 0.15 mm or larger to 0.23 mm or smaller.

In the glow plug of the third embodiment, the thickness of the second layer 192a was uniform in any position thereon. However, also in a configuration in which the thickness of the second layer 192a differs from position to position, it is assumed that the durability could be improved by setting at least the average thickness at the standing portion 185a to 0.15 mm or larger and 0.23 mm or smaller. Since the standing portion 185a has the first bent portion 188 and the second bent portion 189, the standing portion 185a constitutes a portion where the residual stress is applied thereto with high possibility when the standing portion 185a is formed or a portion where the combustion gas flows directly thereto with high possibility. Due to this, it is assumed that the durability of the glow plug as a whole can be improved by satisfying the condition that the average thickness of the standing portion 185a is 0.15 mm or larger and 0.23 mm or smaller.

E. Modified Examples

E-1. Modified Example 1

In the glow plug of the second embodiment, in the three layers 193, 194, 195, the layer which is positioned more outwards along the radial direction RD has the larger thickness at the first cylindrical portion 181 and the second cylindrical portion 182. The layer which is positioned more forwards along the axial direction AD at the standing portion 185 has the larger thickness. However, the invention is not limited to this configuration.

Figure 7:
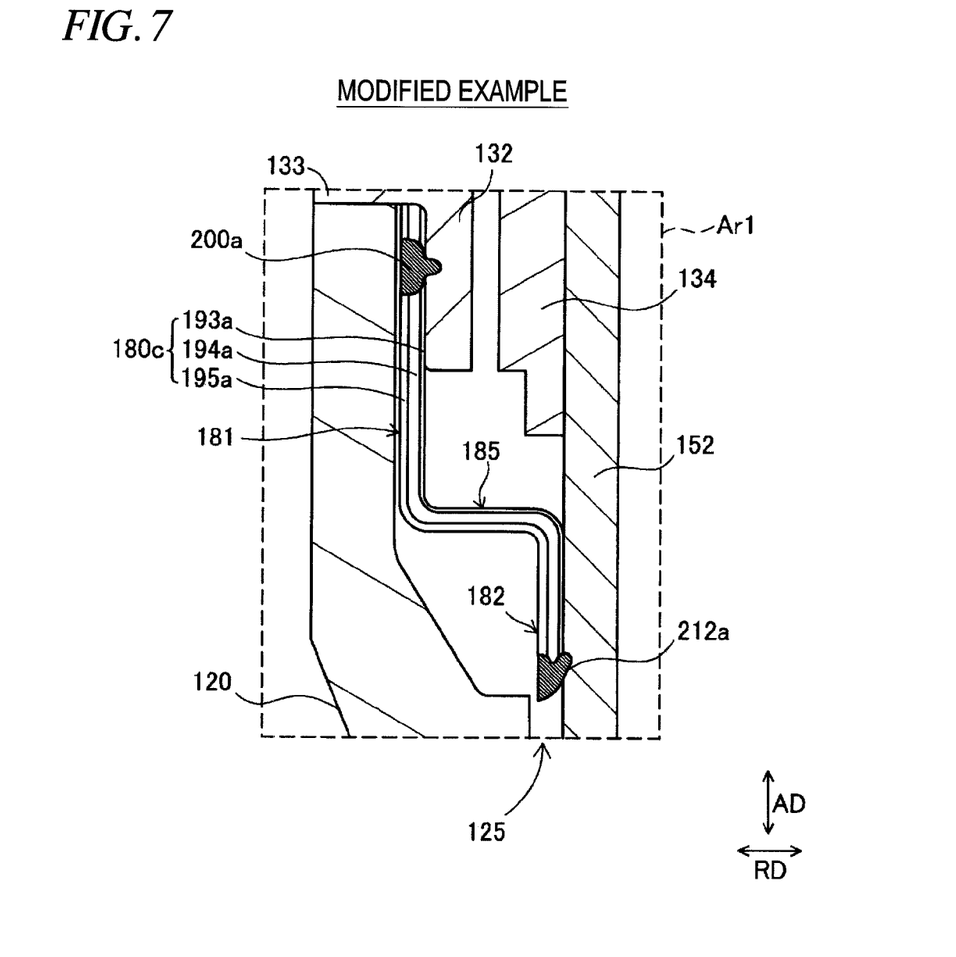
FIG. 7 is an enlarged sectional view of an area near a membrane portion of a glow plug of a modified example 1.

FIG. 7 is an enlarged sectional view of an area near a membrane portion of a glow plug of a modified example 1. In FIG. 7, an enlarged sectional view of an area Ar1 is shown which is identical to the area Ar1 of the first embodiment shown in FIG. 2 with respect to position and size. The glow plug of the modified example 1 differs from the glow plug of the second embodiment in that a membrane portion 180c is provided in place of the membrane portion 180 and is the same in the other configurations.

The membrane portion 180c has a configuration in which a first layer 193a, a second layer 194a and a third layer 195a are laminated one on another. The positional relationship between the first layer 193a, the second layer 194a and the third layer 195a at a first cylindrical portion 181, a second cylindrical portion 182 and a standing portion 185 are the same as the positional relationship between the individual layers 193, 194, 195 of the second embodiment.

When comparing respective thicknesses of the layers 193a, 194a, 195a, the thickness of the first layer 193a is the smallest or thinnest, the thickness of the third layer 195a is the second smallest or thinnest, and the thickness of the second layer 194a is the largest or thickest.

The glow plug of the modified example 1 that is configured in the way described above provides the same advantage as that provided by the glow plug of the second embodiment. Namely, for example, the thickness of the second layer 194a which is positioned more outwards along the radial direction RD than the first layer 193a at the first cylindrical portion 181 and the second cylindrical portion 182 and is positioned more forwards along the axial direction AD than the first layer 193a at the standing portion 185 is made larger than the thickness of the first layer 193a. Therefore, the rigidity of the layer positioned closer to the combustion chamber can be enhanced so as to improve the durability of the membrane portion 180c, and the transfer of heat to the first layer 193a which is positioned more inwards can be suppressed.

In the configuration of the modified example 1 shown in FIG. 7, the thickness of the first layer 193a and the thickness of the third layer 195a may be the same. Similarly, in the second embodiment, the thickness of the first layer 193 and the thickness of the second layer 194 may be the same, or the thickness of the second layer 194 and the thickness of the third layer 195 may be the same.

In the configuration of the modified example 1 shown in FIG. 7, the first layer 193a and the second layer 194a correspond to a first layer and second layer of claims.

E-2. Modified Example 2

In the first embodiment, the membrane portion 180 has the double-layer construction, and in the second embodiment, the membrane portion 180a has the three-layer construction. However, a multi-layer construction having an arbitrary number of layers equal to or larger than four layers may be adopted in place of the double-layer and three-layer constructions. Even in the multi-layer construction, when comparing the thicknesses of any two layers at the standing portion, it is preferable that the thickness of the layer which is positioned more forwards is larger than the thickness of the layer which is positioned more rearwards.

E-3. Modified Example 3

In the glow plugs of the embodiments, compared with the layers 191, 194, 193, 191a which correspond to the first layer of the glow plug of the invention, the layers 192, 195, 194, 192a which correspond to the second layer of the glow plug of the invention preferably have at least one of characteristics which will be described below in addition to the difference in thickness that has been described above. The characteristics are a characteristic in which the second layer has a thermal expansion coefficient which is smaller than that of the first layer and a characteristic in which the second layer has a resistance to high temperature which is higher than the resistance to high temperature of the first layer. The high-temperature load bearing capacity is defined by a load bearing capacity of 0.2% at 400° C., for example. With either of the two characteristics provided, the extension or contraction of the second layer (the layers 192, 195, 194, 192a) associated with a change in temperature can be suppressed while improving the durability of the membrane portion. The difference in thermal expansion coefficient between the first layer and the second layer may be realized by forming the first layer (the layers 191, 194, 193, 191a) from INCOLOY (trade name) or INCONEL (trade name) and the second layer (the layers 192, 195, 194, 192a) from SUS (stainless).

E-4. Modified Example 4

In the embodiments, the weld joints 200, 212, 200a, 212a are formed though laser welding in which the two or three layers are pierced altogether at one time by laser, however, the invention is not limited to this approach.

Figure 8A:
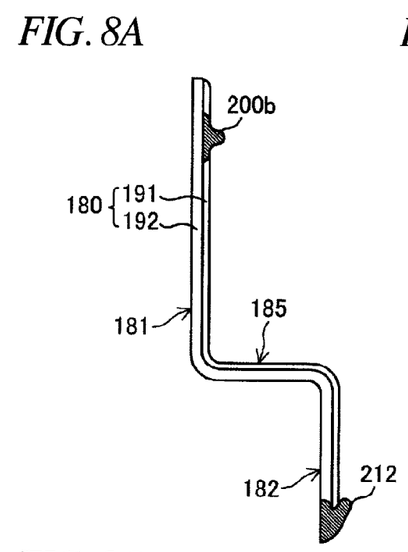
Figure 8B:
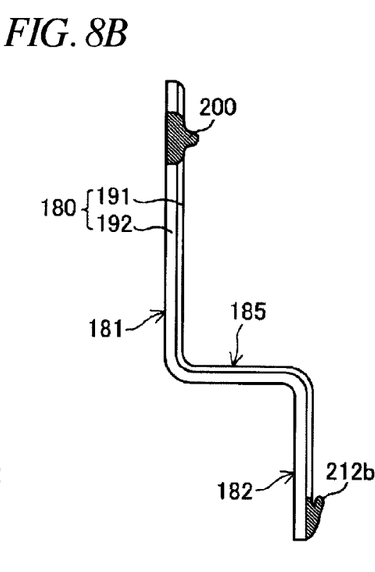
Figure 8C:
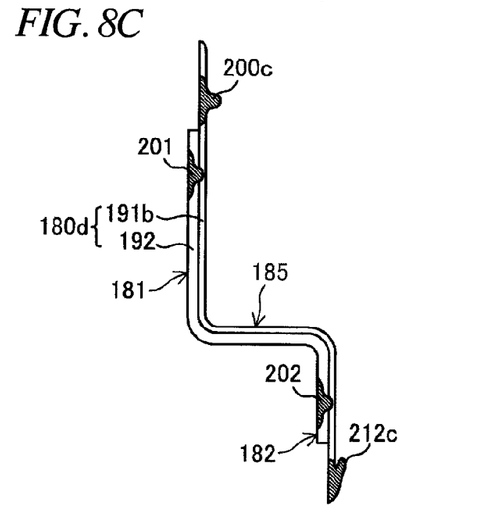

FIGS. 8 (8A, 8B and 8C) shows explanatory diagrams showing weld joints in a glow plug of the modified example 4. FIG. 8A shows a first form of weld joints of the modified example 4, FIG. 8B shows a second form of weld joints of the modified example 4, and FIG. 8C shows a third form of weld joints of the modified example 4.

As shown in FIG. 8A, in a membrane portion 180 according to the first form of the modified example 4, a weld joint 200b is formed in place of the weld joint 200. Being different from the weld joint 200, in the weld joint 200b, of a first layer 191 and a second layer 192, only the first layer 191 is connected to a sensor fixing member 132.

As shown in FIG. 8B, in a membrane portion 180 according to the second form of the modified example 4, a weld joint 212b is formed in place of the weld joint 212. Being different from the weld joint 212, in the weld joint 212b, of a first layer 191 and a second layer 192, only the first layer 191 is connected to a sheathed tube 152.

As shown in FIG. 8C, a membrane portion 180d according to the third form of the modified example 4 differs from the membrane portion 180 of the first embodiment in that a first layer 191b is provided in place of the first layer 191, in that a weld joint 201 and a weld joint 200c are provided in place of the weld joint 200, and in that a weld joint 202 and a weld joint 212c are provided in place of the weld joint 212.

In the first layer 191b, a length along the axial direction AD is larger than that of the first layer 191 of the first embodiment. Because of this, as shown in FIG. 8C, part of a rear end side of a weld joint 200c is not covered by a second layer 192. A rear end portion of the first layer 191b which is not covered by the second layer 192 is connected to a sensor fixing member 132 via the weld joint 200c. Similarly, part of a front end side of the weld joint 212c is not covered by the second layer 192, and a front end portion of the first layer 191b which is not covered by the second layer 192 is connected to a sheathed tube 152 via the weld joint 212c. The glow plug of the modified example 4 which is configured in the way described above provides the same advantage as that provided by the glow plug of the first embodiment.

In the embodiments that have been described heretofore, while the weld joint where the first cylindrical portion 181 is connected to the sensor fixing member 132 is one (the weld joint 200 or 200a), a plurality of weld joints may be provided. Similarly, in the embodiments, while the weld joint where the second cylindrical portion 182 is connected to the sheathed tube 152 is one (the weld joint 212 or 212a), a plurality of weld joints may be provided. In these configurations, being different from the first to third forms shown in FIG. 8, any one of the plurality of weld joints may be formed through laser welding in which two or three layers are pierced altogether at one time.

E-5. Modified Example 5

In the embodiments, while the individual layers which make up the double-layer or multi-layer construction are formed of SUS (stainless), the layers may be formed of any metallic material such as carbon steel. Additionally, as described in the modified example 3, the layers may be formed of metallic materials which are different from each other. Additionally, in the layers, at least one layer may be formed of an intermetallic compound in place of the metals.

E-6. Modified Example 6

In the embodiments, while the first cylindrical portion 181 and the second cylindrical portion 182 are shaped so as to extend in the axial direction AD, the cylindrical portions may be shaped so as to extend along an arbitrary direction including a component in the axial direction AD. In addition, while the standing portion 185, 185a are shaped so as to extend in the radial direction RD, the standing portion may be shaped so as to extend along an arbitrary direction including a component in the radial direction RD.

E-7. Modified Example 7

In the embodiments, while the heater made up of the sheathed tube 152, the heating coil 154 and the insulating powder 155 is used as the heater portion 150, a heater may be adopted which is configured to use a ceramic heater. Specifically, an assembly may be used as the heater portion 150 which is made up of a ceramic heater and a tubular metallic outer tube which is fixed to an outer circumferential surface of the ceramic heater. In this configuration, a second cylindrical portion of a membrane portion is joined to the metallic outer tube.

The invention is not limited to the embodiments, examples and modified examples, and hence, the invention can be realized in various forms without departing from the spirit and scope of the invention. For example, the embodiments which correspond to the technical characteristics in the forms described as solving the problems in the summary of the invention and the technical characteristics described in the modified examples can be exchanged or combined as required to solve part or all of the problems described above or to achieve part or all of the advantages described. Additionally, in the event that the technical characteristics are not described as being essential, those can be deleted as required.

What is claimed is:
1. A glow plug comprising:
a cylindrical housing which extends along an axial direction;
a rod-shaped heater configured to be displaced along the axial direction and having
one end portion which extends along the axial direction and which is disposed within the housing, and
an other end portion which is disposed so as to be exposed from the housing;
a membrane portion configured to connect together the heater and the housing and having a continuously multi-layer construction which has a first layer, and a second layer of which at least part is positioned nearer to the other end portion in the axial direction of the heater than the first layer; and a pressure sensor which measures a pressure within a combustion chamber in which the other end portion is disposed by making use of a displacement of the heater, wherein at least a portion of the second layer is positioned at an outer side of the first layer in a radial direction perpendicular to the axial direction;

a thickness of the second layer is larger than a thickness of the first layer.

2. The glow plug according to claim 1, wherein the first layer and the second layer each have a standing portion which extends along a direction which includes a radial component which is normal to the axial direction of the heater, and wherein the standing portion of the second layer is positioned nearer to the other end portion in the axial direction of the heater than the standing portion of the first layer.

3. The glow plug according to claim 1, wherein a thermal expansion coefficient of the second layer is smaller than a thermal expansion coefficient of the first layer.

4. The glow plug according to claim 1, wherein a resistance to high temperature of the second layer is larger than a resistance to high temperature of the first layer.

5. The glow plug according to claim 1, wherein the first layer and the second layer are adjacent to each other in the multi-layer construction, and wherein the first layer and the second layer are at least partially in contact with each other in a laminating direction.

6. The glow plug according to claim 5, wherein a gap is provided between the first layer and the second layer.

7. The glow plug according to claim 1, wherein the membrane portion has a cylindrical portion which extends along a direction which includes the axial direction of the heater, and wherein among the first layer and the second layer of the membrane portion, the second layer is positioned outermost in a radial direction which is normal to the axial direction of the heater.

8. The glow plug according to claim 1, wherein the membrane portion has a cylindrical portion which extends along a direction which includes the axial direction of the heater, and wherein among the first layer and the second layer of the membrane portion, the first layer is positioned innermost in a radial direction which is normal to the axial direction of the heater.

9. The glow plug according to claim 1, wherein the membrane portion has a first cylindrical portion which extends in a direction which includes the axial direction of the heater and which is connected to the housing, a second cylindrical portion which extends in a direction which includes the axial direction of the heater and which is connected to the heater, and a standing portion which is disposed between the first cylindrical portion and the second cylindrical portion and which is connected individually to the first cylindrical portion and the second cylindrical portion, wherein the second layer is positioned nearest to the other end portion in the standing portion, and wherein an average thickness of the second layer in the membrane portion is 0.15 mm or larger and 0.23 mm or smaller.

* * * * *